US009649922B2

(12) United States Patent
Amagai et al.

(10) Patent No.: US 9,649,922 B2
(45) Date of Patent: May 16, 2017

(54) DOOR SEAL-EQUIPPED VEHICLE BODY STRUCTURE

(71) Applicant: HONDA MOTOR CO., LTD., Minato-ku, Tokyo (JP)

(72) Inventors: Toyohisa Amagai, Wako (JP); Futoshi Kobayashi, Wako (JP); Kinji Hoshikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/036,330

(22) PCT Filed: Nov. 15, 2014

(86) PCT No.: PCT/JP2014/080279
§ 371 (c)(1),
(2) Date: May 12, 2016

(87) PCT Pub. No.: WO2015/072558
PCT Pub. Date: May 21, 2015

(65) Prior Publication Data
US 2016/0368356 A1  Dec. 22, 2016

(30) Foreign Application Priority Data

Nov. 15, 2013  (JP) ................................ 2013-237031

(51) Int. Cl.
| | |
|---|---|
| *B60J 10/08* | (2006.01) |
| *B60J 10/86* | (2016.01) |
| *B60J 10/22* | (2016.01) |
| *B60J 10/24* | (2016.01) |
| *B60J 10/21* | (2016.01) |
| *B60J 10/25* | (2016.01) |

(Continued)

(52) U.S. Cl.
CPC ............... *B60J 10/86* (2016.02); *B60J 10/21* (2016.02); *B60J 10/22* (2016.02); *B60J 10/24* (2016.02); *B60J 10/25* (2016.02); *B60J 10/36* (2016.02); *B60J 10/40* (2016.02)

(58) Field of Classification Search
CPC . B60J 10/086; B60J 10/86; B60J 10/24; B60J 10/25
USPC ............................................... 296/146.9, 208
See application file for complete search history.

(56) References Cited

U.S. PATENT DOCUMENTS 4,492,405 A    1/1985  Chikaraishi et al.

FOREIGN PATENT DOCUMENTS

| JP | 2006-248422 A | 9/2006 |
| JP | 2013-112066 A | 6/2013 |

OTHER PUBLICATIONS

PCT/ISA/210 from International Application PCT/JP2014/080279.

*Primary Examiner* — Dennis H Pedder
(74) *Attorney, Agent, or Firm* — Carrier Blackman & Associates, P.C.; Joseph P. Carrier; William D. Blackman

(57) ABSTRACT

A vehicle structure with a door seal includes an upper-edge seal member which is attached to a vehicle body along an upper edge of a front door opening and a vertical seal member which is attached to a rear end portion of a front side door (door body) in a state of being separated from the upper-edge seal member in a vertical direction. The vertical seal member includes a hollow portion which is formed downward in a hollow shape, an upper-end opening which is open upward in communication with an upper end of the hollow portion, and an enlarged portion which is interposed between the upper-end opening and the hollow portion and is enlarged larger than the hollow portion.

5 Claims, 15 Drawing Sheets

(51) Int. Cl.
*B60J 10/40* (2016.01)
*B60J 10/36* (2016.01)

Fr ⟵⟶ Rr

DOOR SEAL-EQUIPPED VEHICLE BODY STRUCTURE

TECHNICAL FIELD

The present invention relates to a vehicle structure with a door seal in which a door is openably and closably supported by a door opening of a vehicle body, and a vertical seal member is attached to an end portion of the door in a door width direction.

BACKGROUND ART

A front end portion of a door is turnably attached to a door opening of a vehicle body, an upper-edge seal member is attached to an upper edge of the door opening, and a vertical seal member is attached to a rear end portion of the door. In a state where the door is closed, an upper end portion of the vertical seal member is disposed on the lower side of the upper-edge seal member with a predetermined gap therebetween. Accordingly, in a state where the door is closed, sealability of the upper-edge seal member or the vertical seal member is excellently ensured.

The vertical seal member extends downward along the rear end portion from a rear upper corner portion of the door. In a state where the door is closed, the vertical seal member is interposed between the door and the door opening, and a clearance between the door and the door opening is sealed by the vertical seal member.

Herein, in a state where the door is closed, the upper end portion of the vertical seal member is disposed on the lower side of the upper-edge seal member with the predetermined gap therebetween. For this reason, it is considered that water enters from the upper-edge seal member and the upper end portion of the vertical seal member to the upper end portion side of the vertical seal member.

As a means for capturing the entering water, it is known that a waterproof lip portion is provided in a portion of the vertical seal member corresponding to the rear upper corner portion of the door. The waterproof lip portion is provided in the vertical seal member so that the water flowing to the rear upper corner portion of the door can be received by the waterproof lip portion.

The waterproof lip portion can prevent (that is, capture) the flowing water from flowing to the rear side of the vehicle body in such a manner that the water is received by the waterproof lip portion. The water which the waterproof lip portion prevents from flowing is guided downward along the vertical seal member (for example, see Patent Document 1).

The vertical seal member of Patent Document 1 is configured such that the water flowing to the rear upper corner portion of the door is received by the waterproof lip portion so that the flow of the water is prevented. However, in a case where the flow of the water is prevented by the waterproof lip portion, the force of the water is applied to the waterproof lip portion.

For this reason, due to the force of the water applied to the waterproof lip portion, it is difficult to maintain a state where the vertical seal member is stable.

PATENT DOCUMENT

Patent Document 1: JP-A-2013-112066

SUMMARY OF THE INVENTION

Problems to be Solved by the Invention

An object of the present invention is to provide a vehicle structure with a door seal in which water flowing between a door opening and a door can be captured, and a vertical seal member can be maintained in a stable state.

Means for Solving the Problems

According to a first aspect of the invention, there is provided a vehicle structure with a door seal in which a door is openably and closably supported by a door opening of a vehicle body, the vehicle structure with the door seal including: an upper-edge seal member which is attached to the vehicle body along an upper edge of the door opening; and a vertical seal member which is vertically separated from the upper-edge seal member, extends vertically, and is attached to an end portion of the door in a door width direction, wherein the vertical seal member includes a hollow portion which is formed downward in a hollow shape, an upper-end opening which is open upward on an upper side of the hollow portion, and an enlarged portion which is interposed between the upper-end opening and the hollow portion and of which an upper end is open and enlarged.

According to a second aspect of the invention, preferably, the door is supported by the vehicle body to be turnable about one end of the door, and the vertical seal member is attached to the other end of the door.

According to a third aspect of the invention, preferably, the door includes a door lock mechanism for fixing the door to the vehicle body, and the door lock mechanism is positioned on the one end side from the vertical seal member, and the vertical seal member includes a closing wall which is provided at a position vertically higher than the door lock mechanism and vertically divides the hollow portion, and an exhaust port which is provided at the same height position as a position of the closing wall in a door thickness direction of the door, and communicates with the upper-end opening.

According to a fourth aspect of the invention, preferably, the closing wall is inclined toward the exhaust port.

According to a fifth aspect of the invention, preferably, the vertical seal member includes a hole portion which is formed at a portion of the hollow portion in the door thickness direction when the hollow portion is formed, and a lip-shaped portion which vertically extends between the hole portion and the exhaust port and protrudes outward.

According to a sixth aspect of the invention, preferably, the lip-shaped portion is positioned in the vicinity of the exhaust port.

According to a seventh aspect of the invention, preferably, the vertical seal member includes a closing portion which partially closes the upper-end opening and is inclined downward toward a center of the hollow portion.

According to an eighth aspect of the invention, preferably, the vertical seal member is attached to the door on a lower side of the closing portion by a clip.

Advantageous Effects of Invention

According to the first aspect of the invention, the vertical seal member includes the hollow portion, and the upper end of the hollow portion communicates with the upper-end opening. Further, the enlarged portion is interposed between the upper-end opening and the hollow portion, and the upper end of the enlarged portion is formed to be larger than the hollow portion.

Accordingly, the upper-end opening can be formed to be open more largely than the hollow portion, and the water flowing between the door opening and the door can be guided to the hollow portion through the upper-end opening.

Thus, the water flowing between the door opening and the door can be reliably captured.

The water flowing between the door opening and the door is guided to the hollow portion through the upper-end opening so that it can be prevented that the force of the flowing water is applied to the vertical seal member. Accordingly, the vertical seal member can be maintained in a stable state.

According to the second aspect of the invention, the door is supported to be turnable about the one end of the door in the vehicle body. For this reason, it is considered that when the door is opened and closed, the turning speed of the other end of the door is increased, and the water flowing on the other end side of the door is scattered.

In this regard, the vertical seal member is attached to the other end of the door. Accordingly, the water flowing on the other end side of the door can be captured by the vertical seal member, and thus it can be suitably suppressed that the water flowing on the other end side of the door is scattered.

According to the third aspect of the invention, the hollow portion of the vertical seal member is vertically divided by the closing wall, and the exhaust port is provided at the same height position as that of the closing wall.

Accordingly, the water flowing between the door opening and the door can be guided to the exhaust port through the upper-end opening, and the guided water can be exhausted from the exhaust port and flow downward along the vertical seal member. Thus, the water flowing between the door opening and the door can be reliably captured.

The closing wall is disposed at a position higher than the door lock mechanism, and the exhaust port positioned at the same height position as that of the closing wall is directed in the door thickness direction. The door lock mechanism is positioned on the one end side compared with the vertical seal member (that is, vehicle body front-rear direction).

Accordingly, the exhaust port can be disposed at a position where the exhaust port is not overlapped with the door lock mechanism in a circumferential direction (that is, displaced position). Thus, the water exhausted from the exhaust port can flow downward while being separated from the door lock mechanism, and thus, it can be prevented that the water is applied to the door lock mechanism.

According to the fourth aspect of the invention, the closing wall is inclined to the exhaust port. Accordingly, the water flowing to the upper-end opening can be smoothly guided to the exhaust port through the closing wall. Thus, the water flowing between the door opening and the door can be captured further suitably.

According to the fifth aspect of the invention, the hole portion is formed in a portion of the hollow portion in the door thickness direction. Further, the lip-shaped portion extending vertically is formed between the hole portion and the exhaust port.

Accordingly, the lip-shaped portion can prevent that the water exhausted from the exhaust port flows to the hole portion or the door lock mechanism, and thus it can be further suitably prevented that the water is applied to the door lock mechanism.

The water exhausted from the exhaust port can be prevented from flowing from the hole portion into the hollow portion. Accordingly, the water exhausted from the exhaust port can be smoothly guided downward along the vertical seal member. Thus, the water flowing between the door opening and the door can be reliably captured.

According to the sixth aspect of the invention, the lip-shaped portion is positioned in the vicinity of the exhaust port.

Herein, it is considered that the exhaust port is provided in the vertical seal member so that it becomes difficult to ensure the rigidity of the vertical seal member. In this regard, the lip-shaped portion is positioned in the vicinity of the exhaust port.

Accordingly, the rigidity of the vertical seal member can be improved by the lip-shaped portion, thereby ensuring the rigidity of the vertical seal member.

According to the seventh aspect of the invention, the closing portion is provided in the upper-end opening so that the upper-end opening can be partially closed by the closing portion. The upper-end opening is partially closed by the closing portion so that the appearance of the vertical seal member (particularly, upper-end opening) can be ensured.

Further, the closing portion is inclined downward toward the center of the hollow portion. Accordingly, the water received in the closing portion can be excellently guided to the upper-end opening.

Thus, the appearance of the vertical seal member (particularly, upper-end opening) is ensured, and the closing portion also can serve as a water passage for guiding water.

According to the eighth aspect of the invention, the clip for attaching the vertical seal member to the door is attached under the closing portion. Accordingly, the clip can be covered from an upper side by the closing portion, and thus the clip can be hidden by the closing portion such that the clip cannot be visually observed.

MODES FOR CARRYING OUT THE INVENTION

A best mode for carrying out the present invention will be described below on the basis of the accompanying drawings. The words "front (Fr)," "rear (Rr)," "left (L)," and "right (R)" conform to directions viewed from a driver.

First Embodiment

A vehicle structure with a door seal 10 according to a first embodiment will be described.

Figure 1:
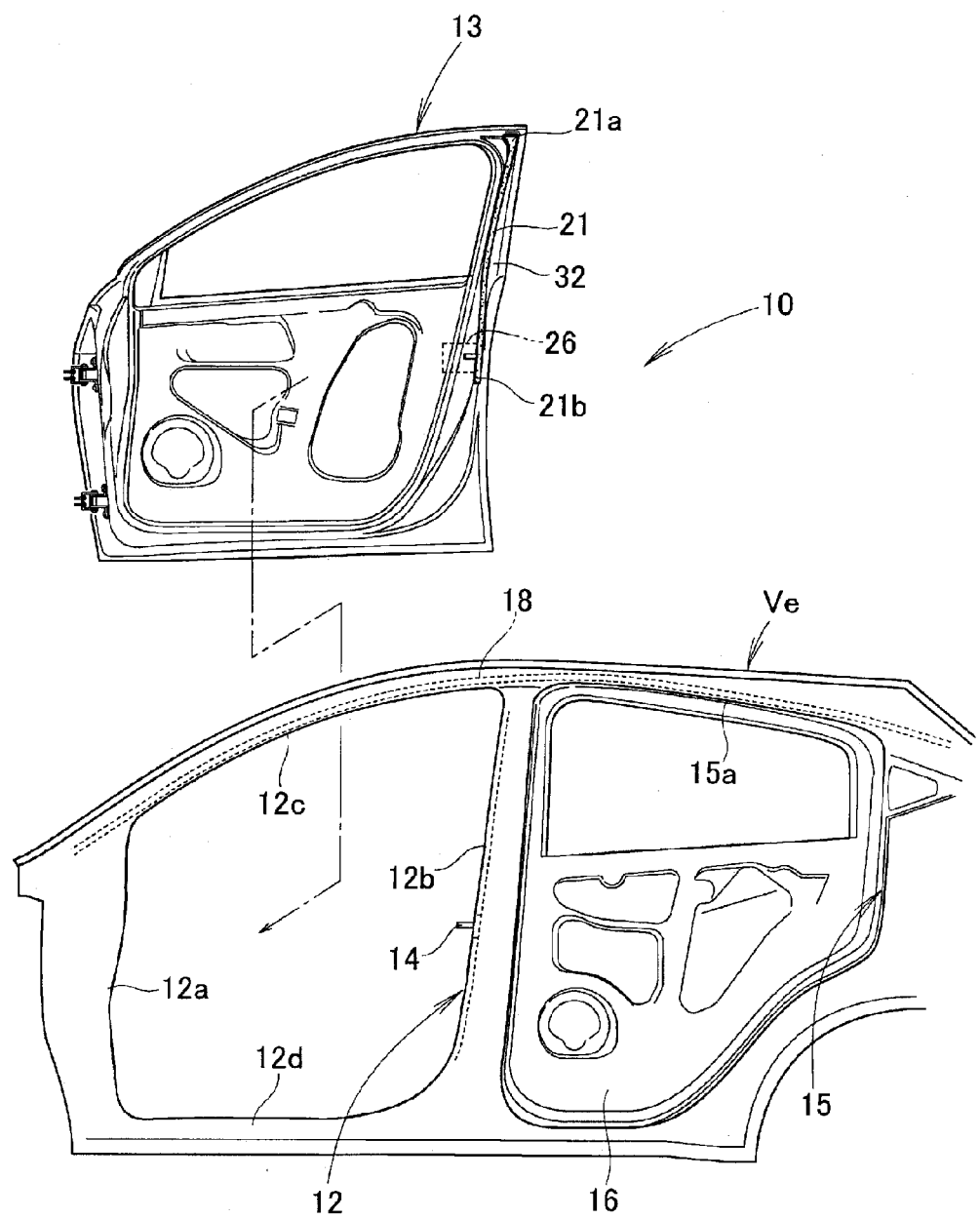
FIG. 1 is a side view illustrating a state where a front side door is disassembled from a vehicle structure with a door seal according to a first embodiment of the present invention.

As illustrated in FIG. 1, the vehicle structure with a door seal 10 includes a front door opening 12 formed in the front side portion of a vehicle body Ve, a front side door 13 openably and closably supported by the front door opening 12, a rear door opening 15 formed in the rear side portion of the vehicle body Ve, and a rear side door 16 openably and closably supported by the rear door opening 15.

The vehicle structure with a door seal 10 further includes an upper-edge seal member 18 provided along an upper edge 12c of the front door opening 12 and an upper edge 15a of the rear door opening 15, and a vertical seal member 21 attached to the front side door 13 in the state of being separated under the upper-edge seal member 18.

The respective upper edges 12c and 15a of the front door opening 12 and the rear door opening 15 form a portion of the vehicle body Ve.

The front door opening 12 includes a front wall 12a extending substantially vertically along a front pillar, a rear wall 12b extending substantially vertically along a center pillar, the upper edge 12c connecting the upper end of the side wall 12a and the upper end of the rear wall 12b, and a lower edge 12d connecting the lower end of the side wall 12a and the lower end of the rear wall 12b.

The front door opening 12 is formed in a substantially rectangular shape configured by the side wall 12a, the rear wall 12b, the upper edge 12c, and the lower edge 12d. The front side door 13 is openably and closably supported by the front door opening 12.

A striker 14 (see also FIG. 4) is attached to the rear wall 12b.

Figure 2:
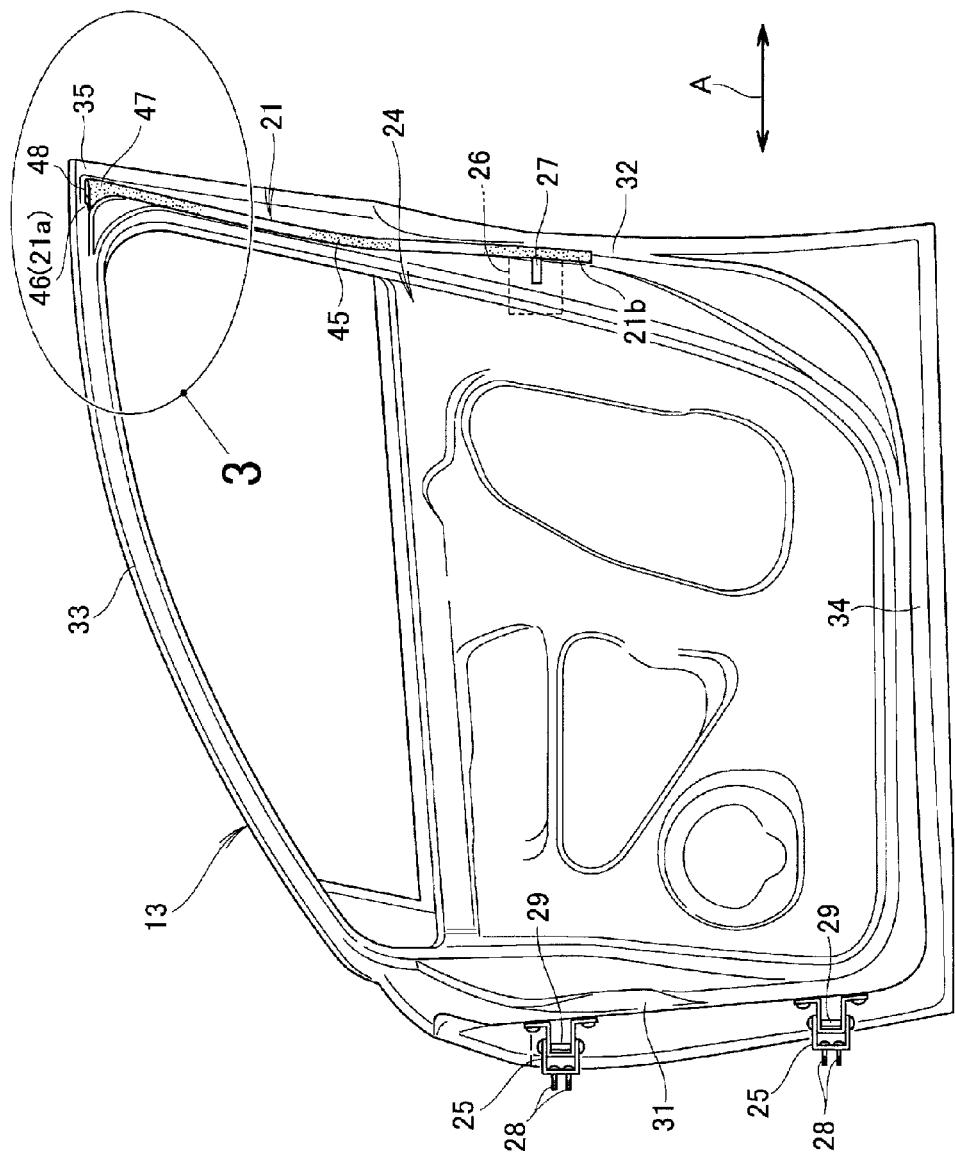
FIG. 2 is a side view illustrating the front side door of FIG. 1.

As illustrated in FIG. 2, the front side door 13 includes a door body 24 which can close the front door opening 12, a hinge portion 25 provided in a front end portion 31 of the door body 24, and a door lock mechanism 26 provided in a rear end portion 32 of the door body 24.

Figure 4:
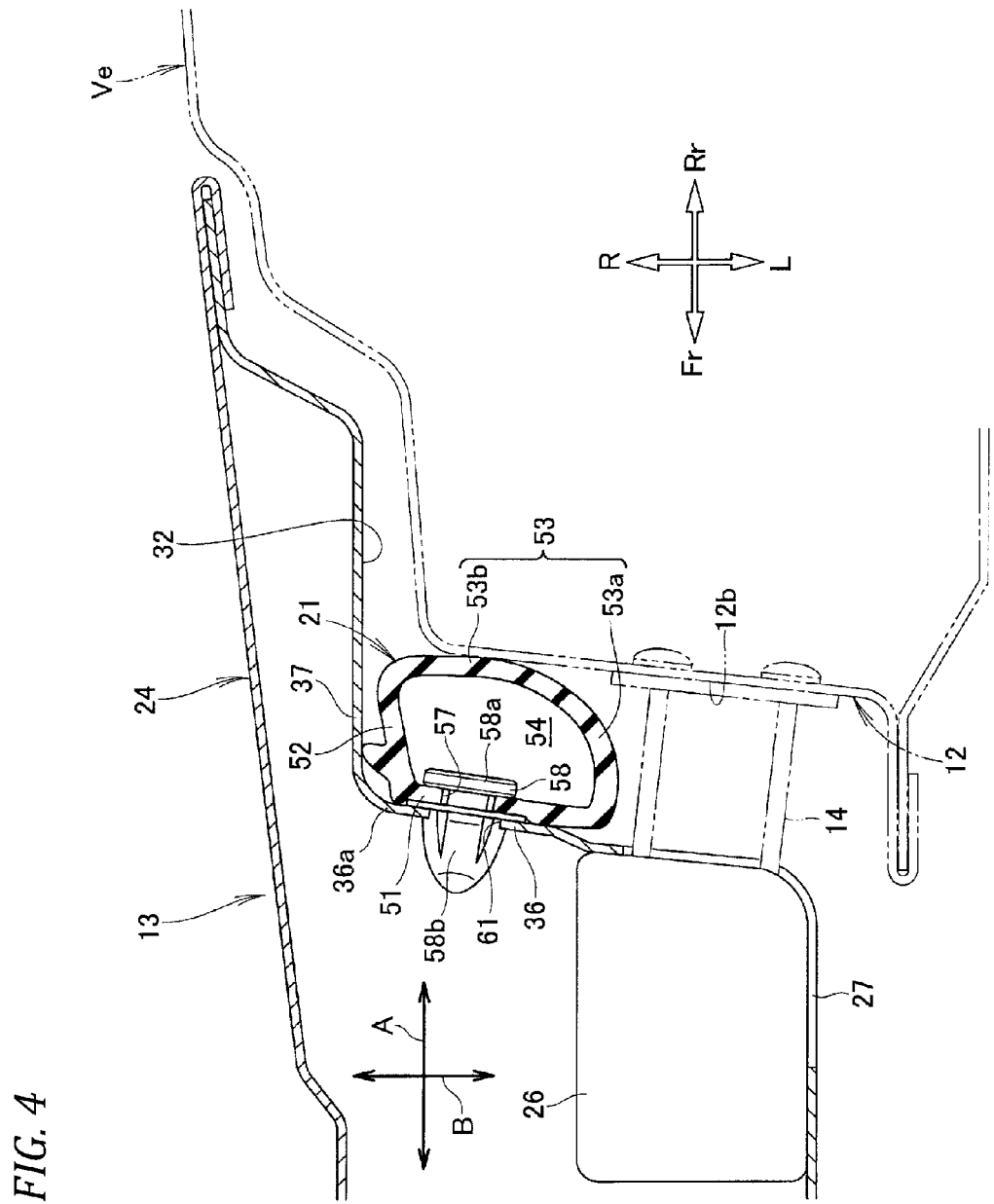
FIG. 4 is a sectional view taken along line 4-4 of FIG. 3.

Arrow A indicates a door width direction of the front side door 13, and arrow B indicates a door thickness direction of the front side door 13 (see FIG. 4).

The hinge portion 25 is attached to the side wall 12a (see FIG. 1) of the front door opening 12 with a bolt 28. Accordingly, the front side door 13 is supported to be turnable about the vicinity of the front end portion 31 of the door body 24 (that is, a support shaft 29 of the hinge portion 25) in the side wall 12a.

The door body 24 is formed in a substantially rectangular shape configured by the front end portion 31, the rear end portion 32, an upper end portion 33, and a lower end portion 34, and a rear intersecting portion 35 is formed in an intersecting portion of the rear end portion 32 and the upper end portion 33.

Figure 3:
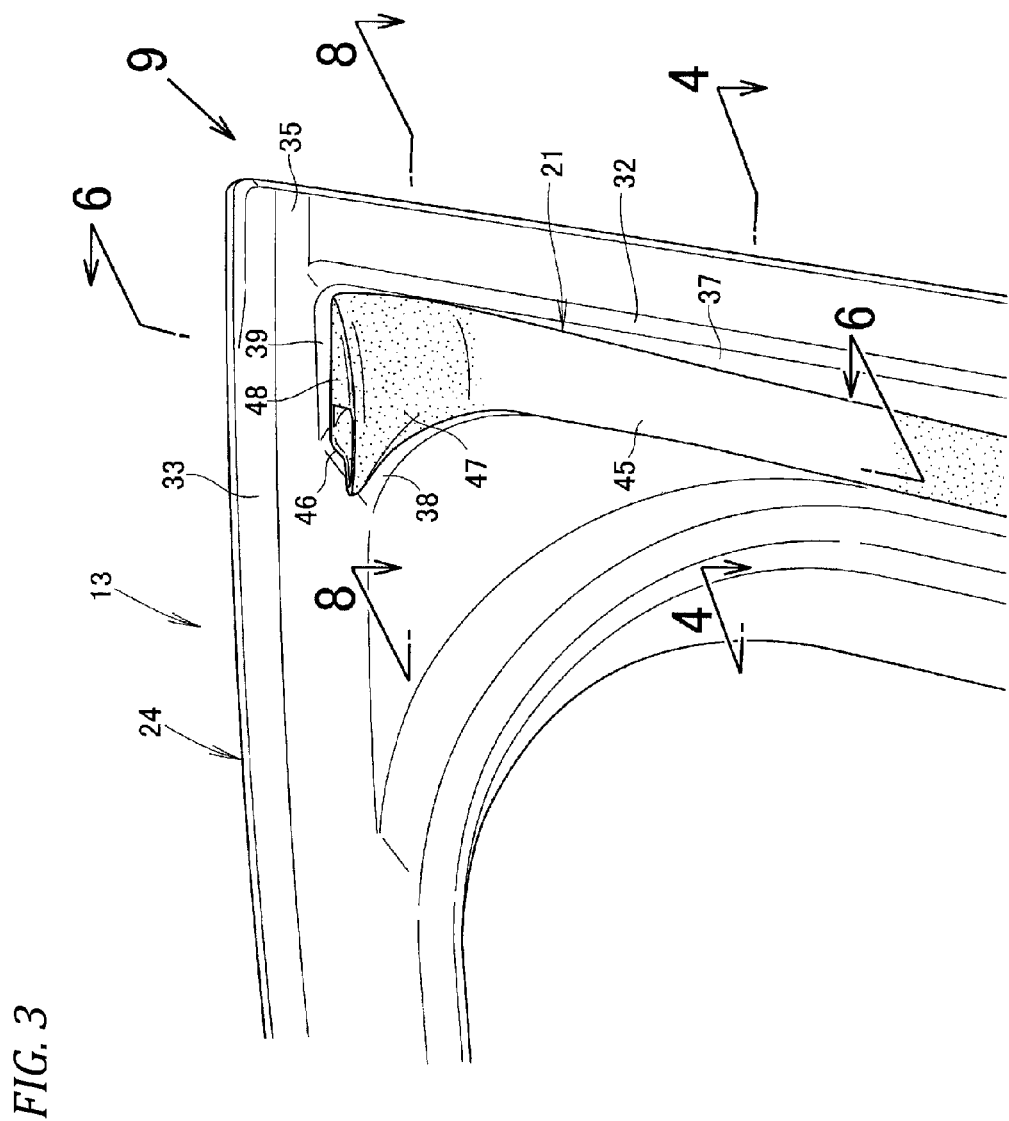
FIG. 3 is an enlarged view illustrating a portion indicated by 3 in FIG. 2.

As illustrated in FIGS. 3 and 4, the rear end portion 32 of the door body 24 includes a first wall 36 disposed in the door thickness direction (arrow B direction), and a second wall 37 disposed from an outer end 36a of the first wall 36 toward the rear side of the door body 24.

The vertical seal member 21 is attached to the first wall 36 and the second wall 37.

Figure 5:
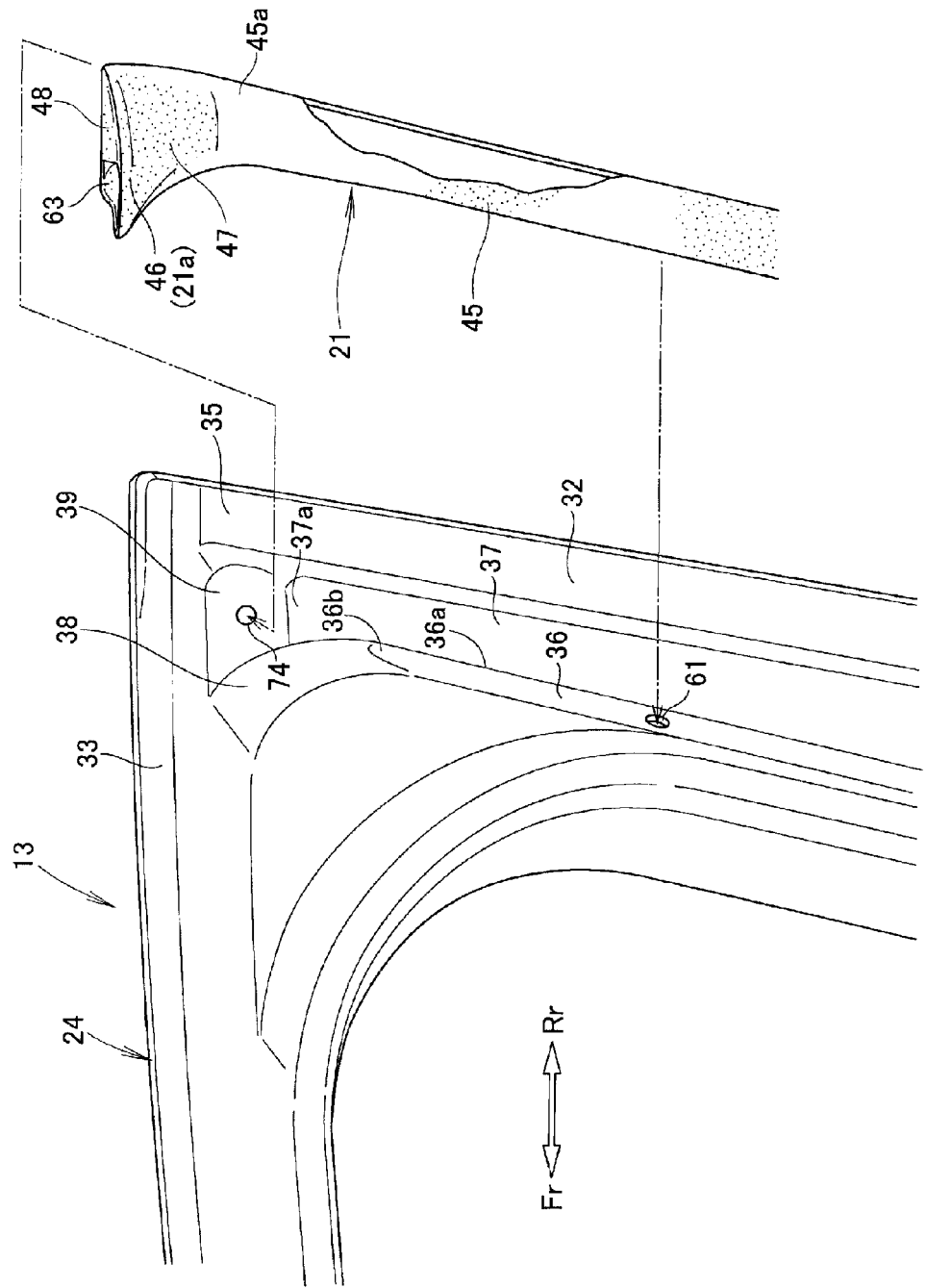
FIG. 5 is a side view illustrating a state where a vertical seal member is disassembled from the front side door of FIG. 3.

As illustrated in FIG. 5, the rear intersecting portion 35 of the door body 24 includes a first intersecting wall 38 and a second intersecting wall 39. The first intersecting wall 38 extends in a curved shape from an upper end 36b of the first wall 36 toward the upper end portion 33 and a vehicle front side. The second intersecting wall 39 extends from an upper end 37a of the second wall 37 toward the upper end portion 33.

Returning to FIG. 2, the door lock mechanism 26 is provided adjacently to the vertical seal member 21 in the rear end portion 32 of the door body 24, and further is positioned closer to the front end portion 31 of the door body 24 than the vertical seal member 21. The door lock mechanism 26 includes an opening 27 which can receive the striker 14 (see FIG. 4).

In a state where the front side door 13 is closed, the striker 14 (see FIG. 4) enters the inside of the door lock mechanism 26 through the opening 27 of the door lock mechanism 26. The latch of the door lock mechanism 26 is engaged with the striker 14 entering the inside so that the front side door 13 is held (fixed) by the front door opening 12 (see FIG. 1).

Figure 6:
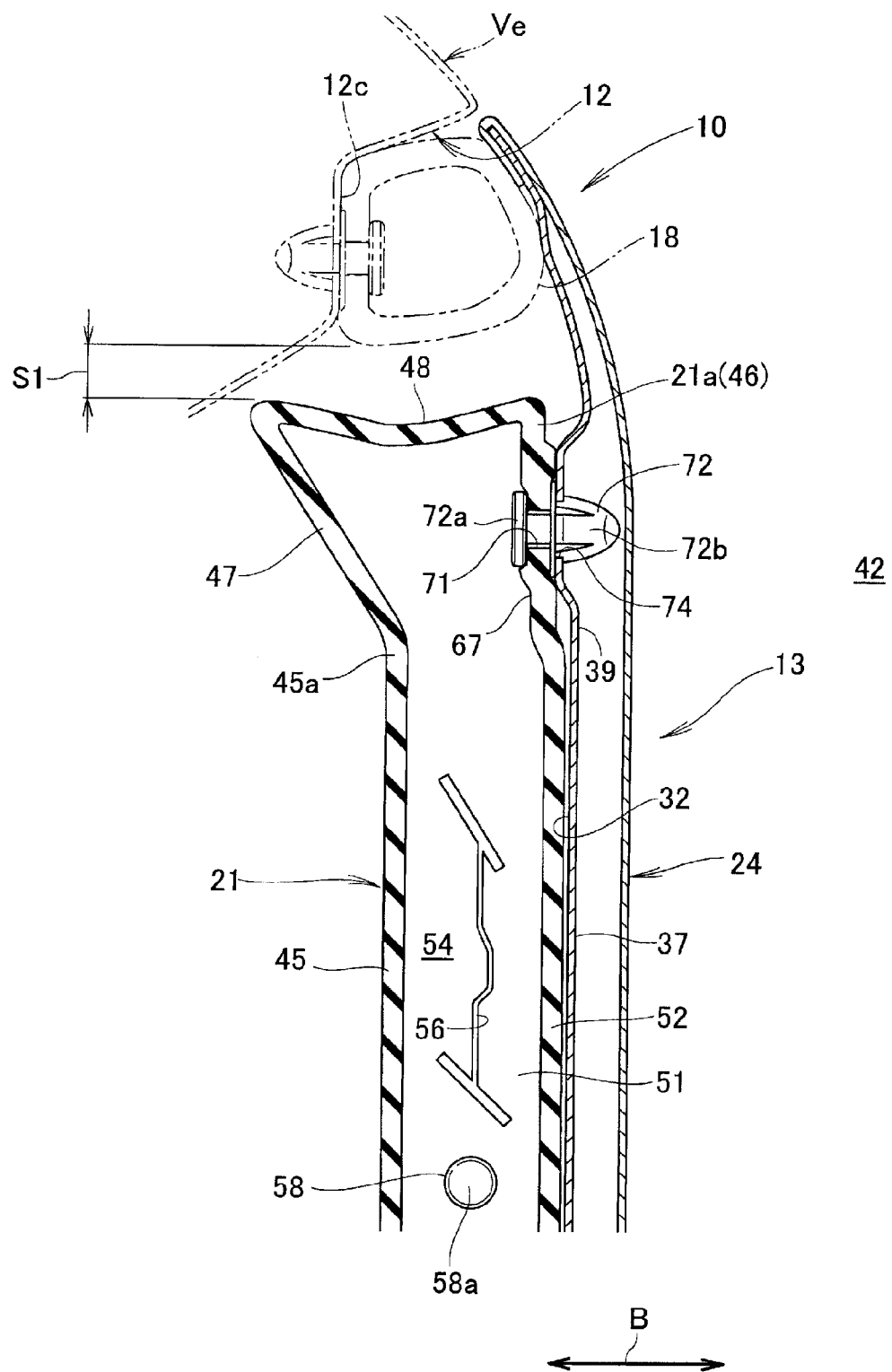
FIG. 6 is a sectional view taken along line 6-6 of FIG. 3.

As illustrated in FIGS. 1 and 6, the upper-edge seal member 18 is attached to the upper edges 12c and 15a along the outer surface of the upper edge 12c of the front door opening 12 and the outer surface of the upper edge 15a of the rear door opening 15.

The outer surface of the upper edge 12c of the front door opening 12 and the outer surface of the upper edge 15a of the rear door opening 15 are surfaces facing a vehicle outside 42.

The vertical seal member 21 is attached to the rear end portion 32 of the door body 24, and vertically extends along the rear end portion 32.

In the vertical seal member 21, an upper end portion 21a (that is, upper-end opening 46) is separated from the upper-edge seal member 18 to the lower side in a vertical direction with a predetermined gap S1 therebetween, and a lower end portion 21b (see also FIG. 2) extends to the lower side of the door lock mechanism 26.

In a state where the front side door 13 is closed, the upper end portion 21a of the vertical seal member 21 is suitably separated from the upper-edge seal member 18 to the lower side with the predetermined gap S1 therebetween. Accordingly, in a state where the front side door 13 is closed, the vertical seal member 21 cannot be overlapped with the upper-edge seal member 18, and thus sealability of the upper-edge seal member 18 and the vertical seal member 21 is excellently secured.

Figure 7:
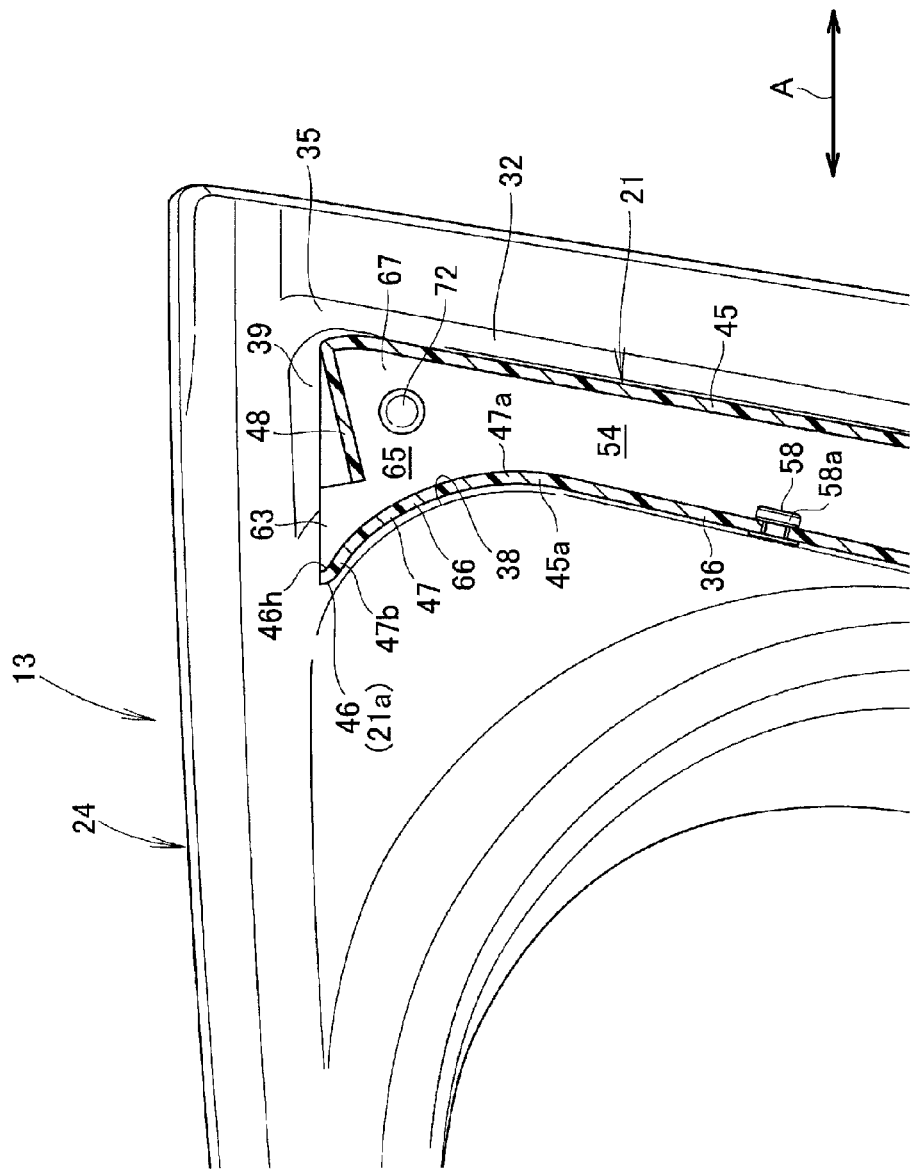
FIG. 7 is a sectional view illustrating a state where the vertical seal member of FIG. 3 is cut off.

As illustrated in FIGS. 5 and 7, the vertical seal member 21 includes a hollow portion 45 which is formed in a hollow shape to be directed downward from the upper end 21a to a lower end 21b (see FIG. 2), the upper-end opening 46 which is open upward to communicate with an upper end 45a of the hollow portion 45, an enlarged portion 47 interposed between the upper-end opening 46 and the hollow portion 45, and a closing portion 48 which partially closes the upper-end opening 46.

As illustrated FIGS. 4 and 6, the hollow portion 45 includes a first mounting portion (a portion in the door thickness direction (arrow B direction)) 51 facing the first wall 36 of the rear end portion 32, a second mounting portion (a portion in the door width direction (arrow A direction)) 52 facing the second wall 37 of the rear end portion 32, and a seal wall 53 connected to the first mounting portion 51 and the second mounting portion 52.

The first mounting portion 51 is disposed in the door thickness direction (arrow B direction). In addition, the second mounting portion 52 is disposed in the door width direction (arrow A direction).

The seal wall 53 includes an inside seal wall 53a which overhangs from the inside end of the first mounting portion 51 in a vehicle width direction to the door width direction (arrow A), and an outside seal wall 53b which overhangs from the inside seal wall 53a toward the second mounting portion 52 in the door thickness direction (arrow B direction).

An inner space 54 is formed inside the hollow portion 45 by the first mounting portion 51, the second mounting portion 52, and the seal wall 53. That is, the hollow portion 45 is a hollow seal portion having the inner space 54.

The hollow portion 45 includes a plurality of hole portions 56 formed in the first mounting portion 51, and a plurality of first mounting holes 57 provided in a portion of the first mounting portion 51 other than the hole portion 56.

The plurality of hole portions 56 are formed when the hollow portion 45 is molded by injection. That is, the plurality of hole portions 56 are holes for extracting a core used to form the inner space 54 of the hollow portion 45 from the inner space 54 to the outside of the hollow portion 45.

A head 58a of a first clip 58 is attached to the first mounting hole 57. An engaging portion 58b of the first clip 58 is engaged to an engaging hole 61 of the first wall 36 so that the first mounting portion 51 is attached to the first wall 36 by the first clip 58.

Figure 8:
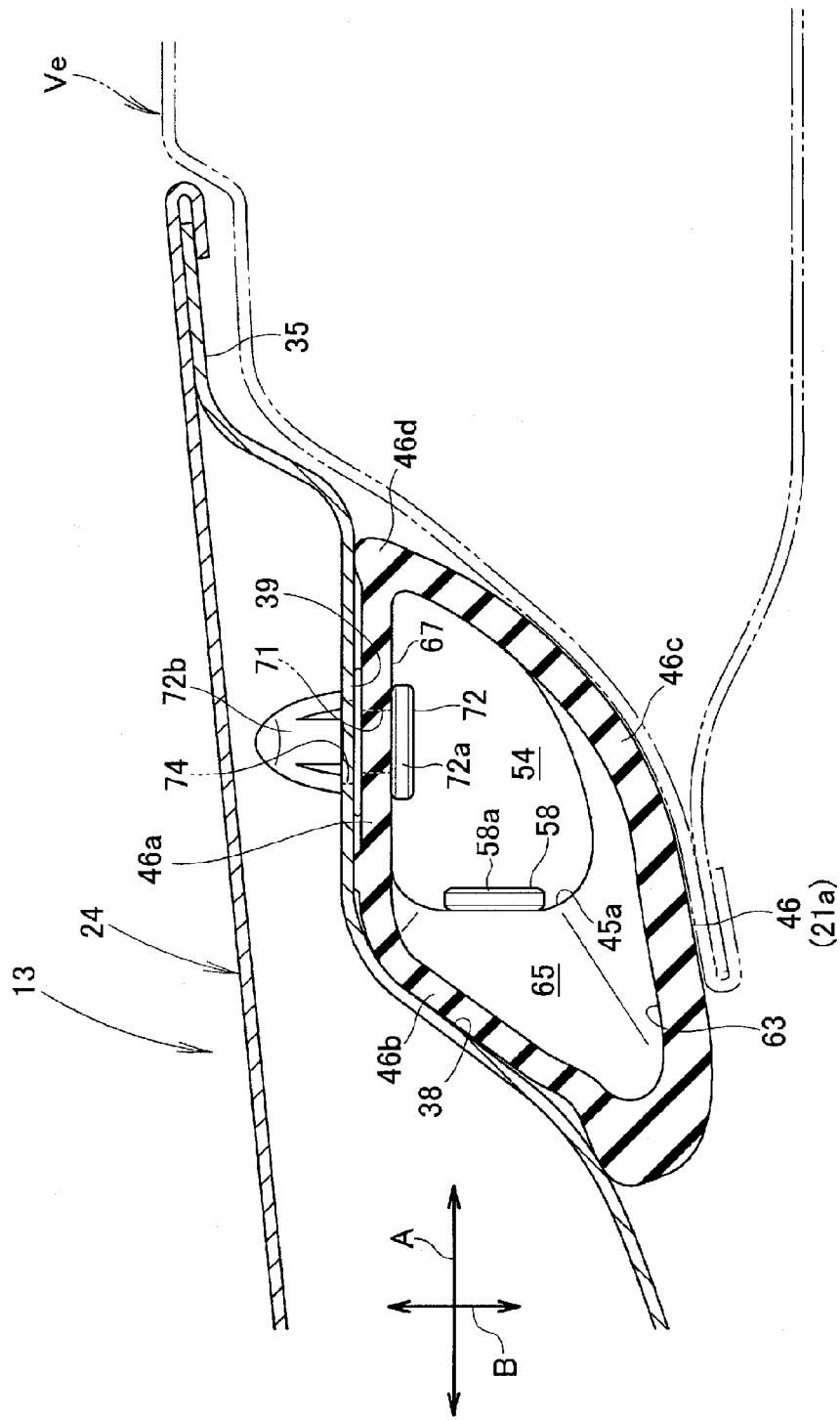
FIG. 8 is a sectional view taken along line 8-8 of FIG. 3.

As illustrated in FIGS. 7 and 8, the upper-end opening 46 is a portion for forming the upper end portion 21a of the vertical seal member 21, and includes a water receiving port 63 which is open upward. The water receiving port 63 communicates with the upper end 45a of the hollow portion 45 through the enlarged portion.

The upper-end opening 46 includes an outer opening side 46a extending along the second intersecting wall 39 of the door body 24, a front opening side 46b extending along the first intersecting wall 38 of the door body 24, and an inner opening side 46c connecting the outer opening side 46a and the front opening side 46b.

The upper-end opening 46 is formed in a substantially triangular shape in plan view configured by the outer opening side 46a, the front opening side 46b, and the inner opening side 46c. That is, the upper-end opening 46 is formed such that a gap between the outer opening side 46a and the inner opening side 46c gradually increases from a rear end 46d toward the front opening side 46b.

The enlarged portion 47 is interposed between the upper-end opening 46 and the hollow portion 45.

In the enlarged portion 47, a lower end 47a communicates with the upper end 45a of the hollow portion 45, and an upper end 47b communicates with the upper-end opening 46. The lower end 47a and the upper end 47b of the enlarged portion 47 are open, and the enlarged portion 47 is formed in a hollow shape having an inner space 65. The inner space 65 of the enlarged portion 47 is formed to be enlarged from the upper end 45a of the hollow portion 45 toward the upper-end opening 46 in a lateral direction (arrow A direction or arrow B direction).

The upper end 47b of the enlarged portion 47 is enlarged further than the hollow portion 45, and thus the water receiving port 63 of the upper-end opening 46 is enlarged largely than the hollow portion 45 in the lateral direction.

The enlarged portion 47 includes a first enlarged wall 66 formed in a curved shape along the first intersecting wall 38, and a second enlarged wall 67 formed along the second intersecting wall 39. That is, the first enlarged wall 66 is supported by the first intersecting wall 38, and the second enlarged wall 67 is supported by the second intersecting wall 39.

The second enlarged wall 67 includes a second mounting hole 71. A head 72a of a second clip 72 is attached to the second mounting hole 71. An engaging portion 72b of the second clip 72 is engaged to an engaging hole 74 of the second intersecting wall 39, and thus the second enlarged wall 67 is attached to the second intersecting wall 39 by the second clip 72.

In a state where the first enlarged wall 66 is supported by the first intersecting wall 38, and the second enlarged wall 67 is supported by the second intersecting wall 39, the second enlarged wall 67 is attached to the second intersecting wall 39 by the second clip 72. Accordingly, the upper-end opening 46 and the enlarged portion 47 are stably held by the rear intersecting portion 35 (that is, first intersecting wall 38 and second intersecting wall 39).

Figure 9:
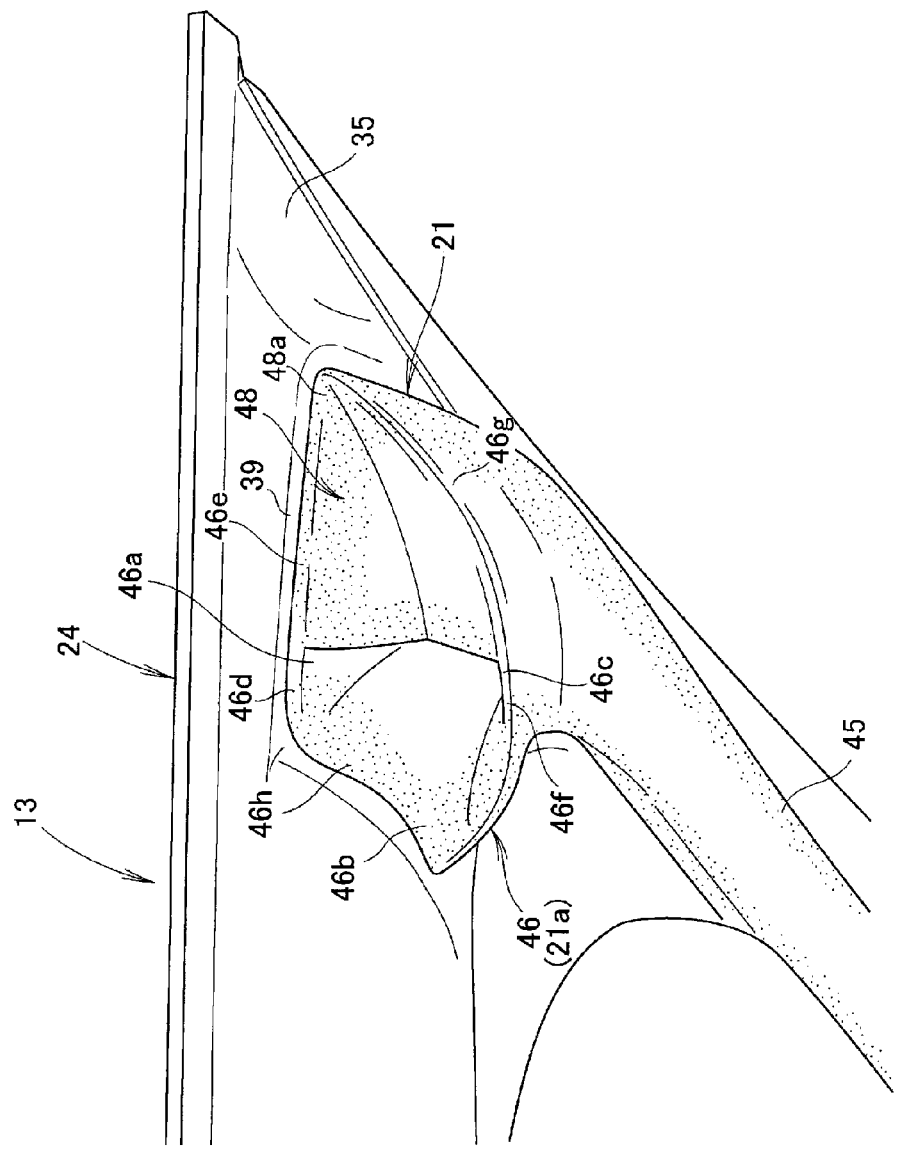
FIG. 9 is a view as seen from a direction of 9 of FIG. 3.

As illustrated in FIGS. 7 and 9, the closing portion 48 is formed integrally with the outer opening side 46a and the inner opening side 46c of the upper-end opening 46.

Specifically, the closing portion 48 is connected with a portion 46e of the outer opening side 46a other than the front portion 46d and a portion 46g of the inner opening side 46c other than a front portion 46f, and is formed in a substantially triangular shape in plan view or a substantially semi-oval shape in plan view. Further, the closing portion 48 is formed in an inclined shape to be inclined downward from a rear end 48a toward the center of the hollow portion 45.

The substantially latter half of the upper-end opening 46 is partially closed by the closing portion 48, and a substantially former half 46h of the upper-end opening 46 is maintained in an open state. The upper-end opening 46 is formed to be larger than the hollow portion 45. Accordingly, the closing portion 48 provided in the upper-end opening 46 is largely formed. Further, the substantially former half 46h of the upper-end opening 46 is largely open.

The substantially latter half of the upper-end opening 46 is partially closed by the closing portion 48 so that the appearance of the vertical seal member 21 (particularly, upper-end opening 46) can be ensured. Further, the closing portion 48 is inclined downward toward the center of the hollow portion 45 so that the water received in the closing portion 48 can be excellently guided to the opening of the substantially former half 46h of the upper-end opening 46.

Accordingly, the appearance of the vertical seal member 21 (particularly, upper-end opening 46) is ensured, and the closing portion also can serve as a water passage for guiding water.

The second clip 72 is provided under the closing portion 48. Accordingly, the second clip 72 can be covered from an upper side by the closing portion 48, and thus the second clip can be hidden by the closing portion 48 such that the second clip 72 cannot be visually observed.

The description will be given on the basis of FIGS. 10A and 10B about an example in which the water flowing between the upper edge 12c (see FIG. 1) of the front door opening 12 and the rear intersecting portion 35 of the front side door 13 is captured by the vertical seal member 21.

Figure 10A:
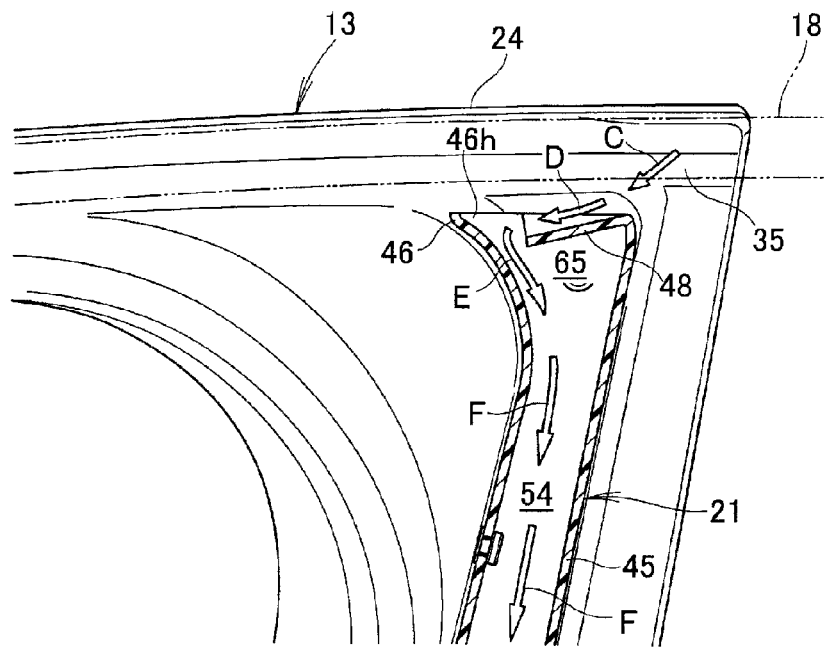
FIG. 10A is a diagram illustrating an example in which water is captured by the vertical seal member according to the first embodiment.

As illustrated in FIG. 10A, water flows, as indicated by arrow C, from between the upper edge 12c of the front door opening 12 and the rear intersecting portion 35 of the front side door 13 to a vehicle interior side, that is, the upper side of the closing portion 48 of the vertical seal member 21.

The closing portion 48 is largely formed, and the substantially former half 46h of the upper-end opening 46 is largely open. Accordingly, the water flowing to the upper side of the closing portion 48 can be efficiently received by the closing portion 48. The water received by the closing portion 48 is guided toward the opening of the substantially former half 46h of the upper-end opening 46 as indicated by arrow D, and is guided to the inner space 65 of the enlarged portion 47 through the opening as indicated by arrow E.

Otherwise, some of the water flowing to the upper side of the closing portion 48 is directly guided to the opening of the substantially former half 46h of the upper-end opening 46, and is guided to the inner space 65 of the enlarged portion 47 through the opening as indicated by arrow E.

The water guided to the inner space 65 of the enlarged portion 47 is guided to the inner space 54 of the hollow portion 45 as indicated by arrow F. Accordingly, the water flowing between the upper edge 12c (see FIG. 1) of the front door opening 12 and the rear intersecting portion 35 of the front side door 13 can be reliably captured by the vertical seal member 21.

The water flowing between the upper edge 12c (see FIG. 1) of the front door opening 12 and the rear intersecting portion 35 of the front side door 13 is received by the closing portion 48, and is guided to the opening of the substantially former half 46h of the upper-end opening 46.

Accordingly, it can be prevented that the force of the flowing water is applied to the vertical seal member 21 (particularly, upper end 21a). Thus, a stable state can be maintained while the vertical seal member 21 is not affected by the force of the flowing water.

Figure 10B:
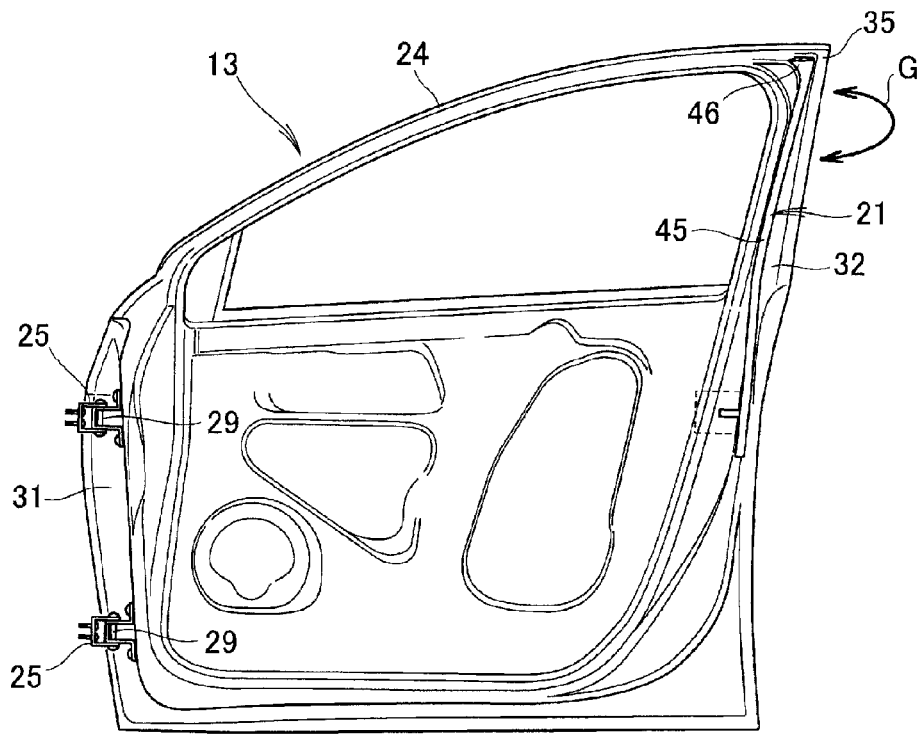
FIG. 10B is a diagram illustrating an example in which it is suppressed that water flowing to a rear end portion side of the front side door according to the first embodiment is scattered.

As illustrated in FIG. 10B, the front side door 13 is opened and closed about the vicinity of the front end portion 31 (that is, the support shaft 29 of the hinge portion 25) of the door body 24 of the front side door 13 in the vehicle width direction as indicated by arrow G.

For this reason, it is considered that the turning speed of the rear end portion 32 of the door body 24 increases so that the water flowing to the rear end portion 32 side of the door body 24 is scattered.

In this regard, the vertical seal member 21 is attached to the rear end portion 32 of the door body 24. Accordingly, the water flowing to the rear intersecting portion 35 side of the door body 24 can be guided from the upper-end opening 46 of the vertical seal member 21 to the hollow portion 45, and be captured by the vertical seal member 21.

Accordingly, it can be suitably suppressed that the water flowing to the rear end portion 32 side of the door body 24 is scattered.

Second Embodiment

A vehicle structure with a door seal 80 according to a second embodiment will be described.

Figure 11:
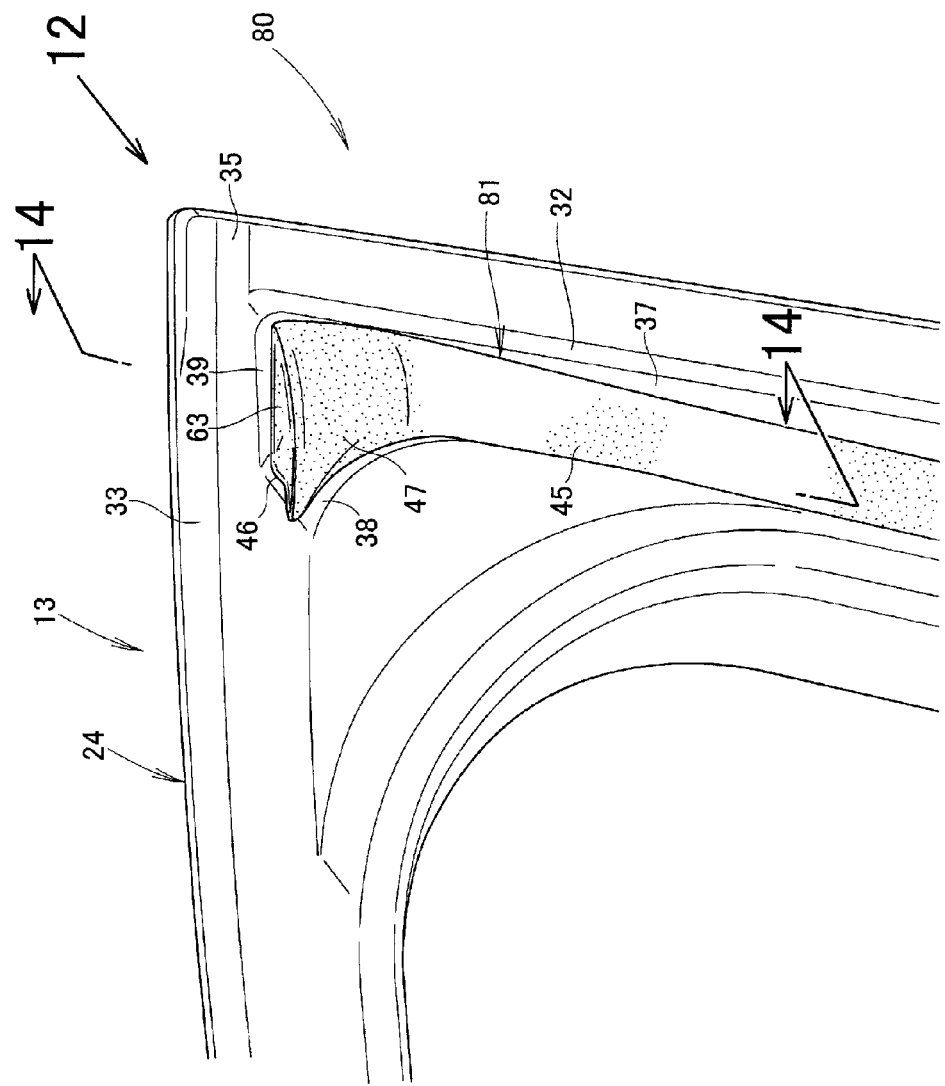
FIG. 11 is a side view illustrating the vehicle structure with a door seal according to a second embodiment of the present invention.

As illustrated in FIG. 11, the vehicle structure with a door seal 80 includes a vertical seal member 81 instead of the vertical seal member 21 (see FIG. 5) according to the first embodiment, and is similar with the vehicle structure with a door seal 10 according to the first embodiment in the other configuration.

Figure 12:
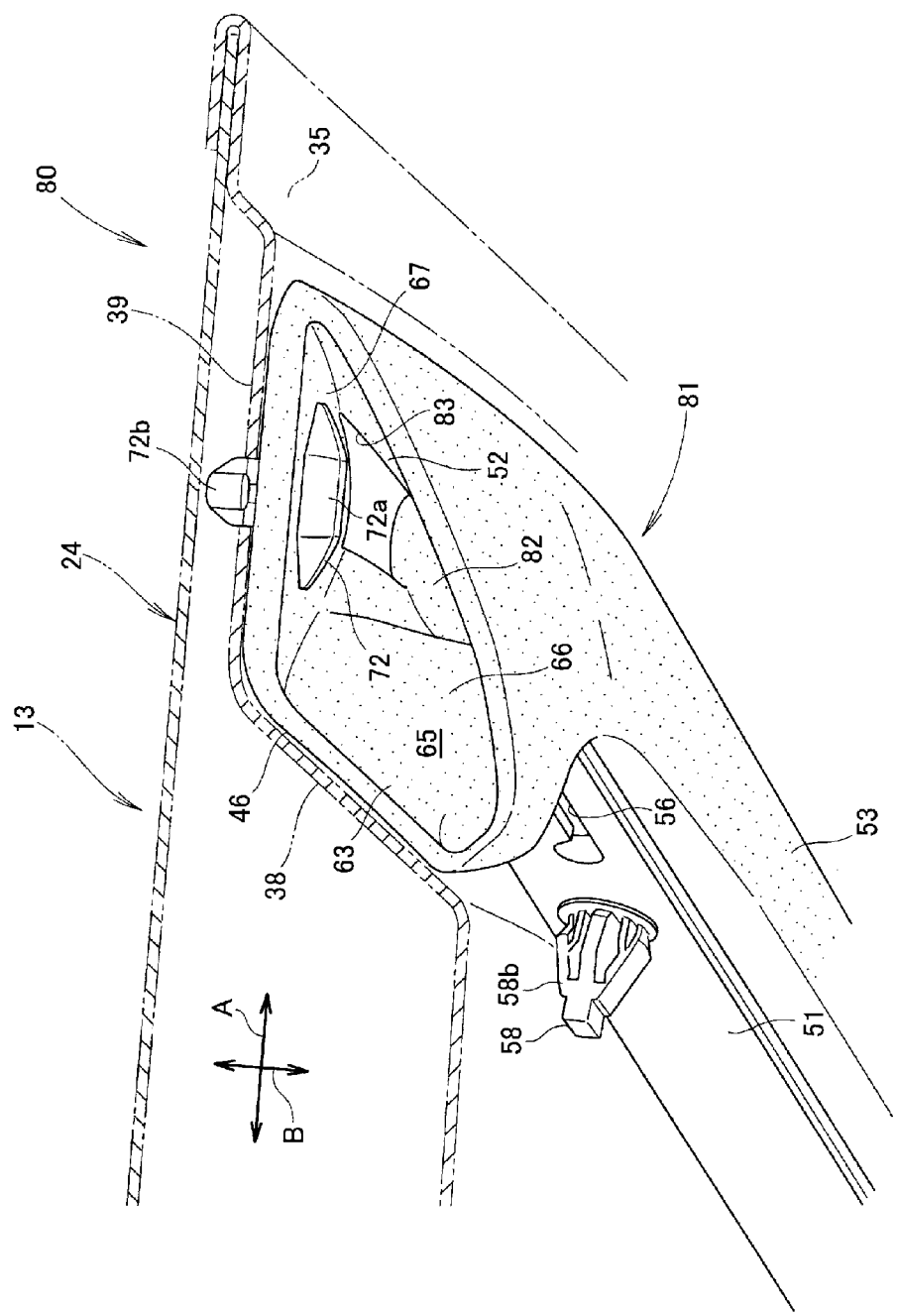
FIG. 12 is a view as seen from a direction of 12 of FIG. 11.
Figure 13:
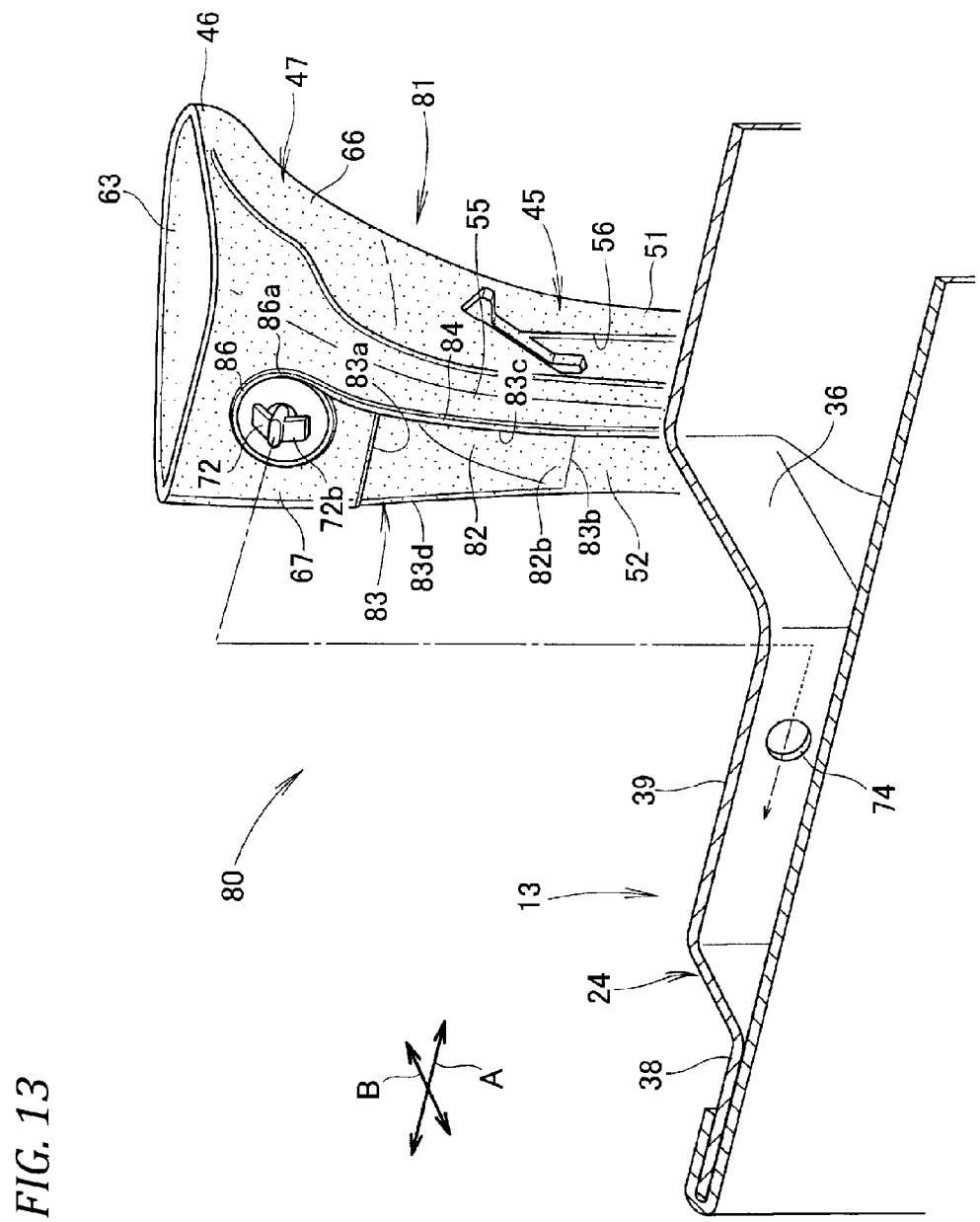
FIG. 13 is an exploded perspective view illustrating a state where the vertical seal member is exploded from the vehicle structure with a door seal according to the second embodiment.

As illustrated in FIGS. 12 and 13, the vertical seal member 81 includes a closing wall 82, an exhaust port 83, and a lip-shaped portion 84 instead of the closing portion 48 (see FIG. 9) of the vertical seal member 21, and is similar with the vertical seal member 21 according to the first embodiment in the other configuration.

The closing wall 82 is provided adjacently to the lower side of the enlarged portion 47, and the exhaust port 83 is formed to face the closing wall 82. Further, the lip-shaped portion 84 is formed adjacently to the exhaust port 83.

Figure 14:
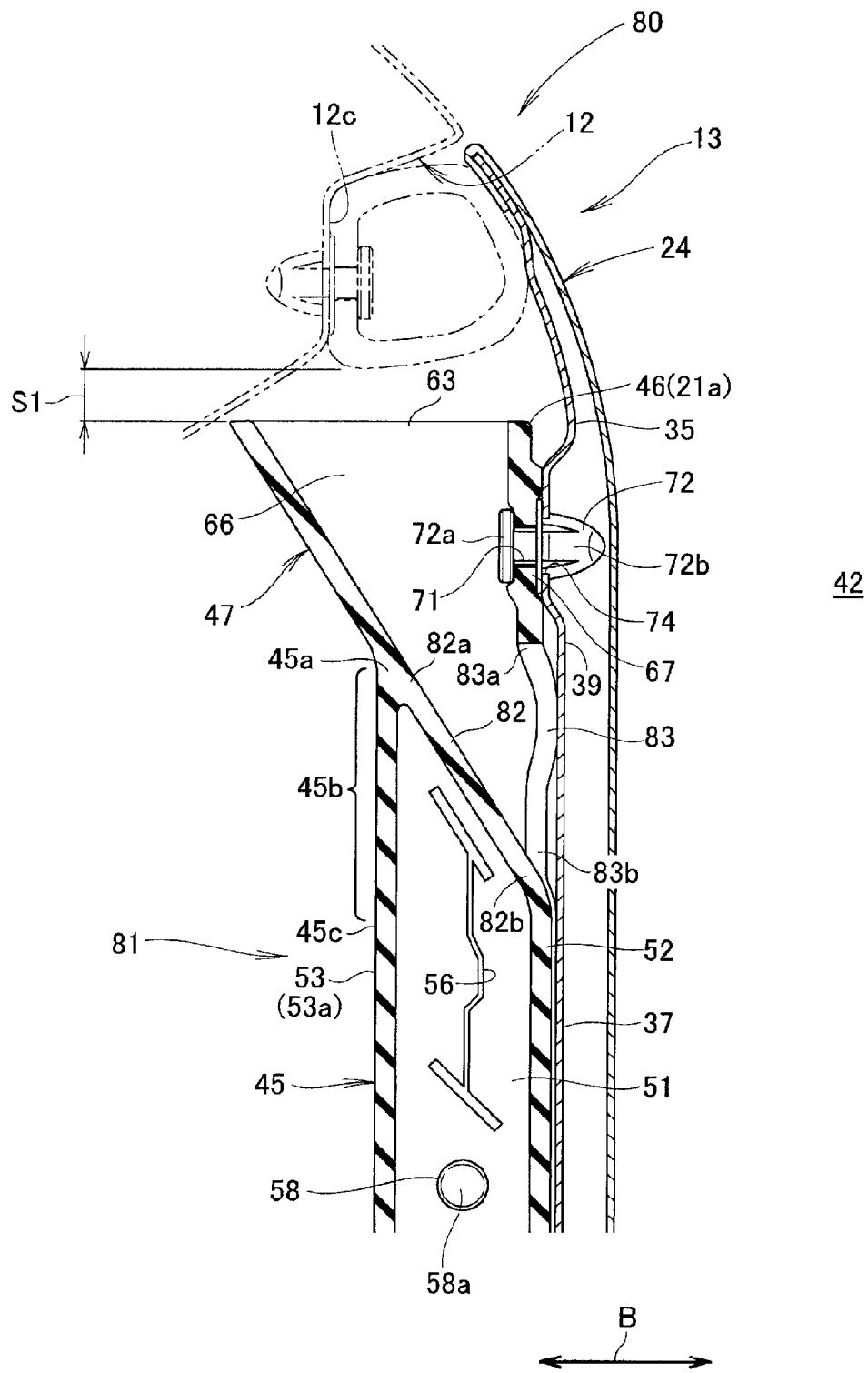
FIG. 14 is a sectional view taken along line 14-14 of FIG. 11.

As illustrated in FIG. 14, the closing wall 82 is provided in an upper portion 45b of the hollow portion 45, and is formed adjacently to the lower side of the enlarged portion 47. The upper portion 45b of the hollow portion 45 is a portion positioned between the upper end 45a and a lower side portion 45c.

That is, the closing wall 82 is formed in an inclined shape on a downgrade from the inside seal wall 53a of the seal wall 53 of the hollow portion 45 toward the second mounting portion 52 of the hollow portion 45.

Specifically, in the inside seal wall 53a of the seal wall 53, an upper end 82a of the closing wall 82 is disposed at the substantially same height position as that of an upper end 83a of the exhaust port 83. Further, in the second mounting portion 52, a lower end 82b of the closing wall 82 is disposed at the substantially same height position as that of a lower end 83b of the exhaust port 83.

Accordingly, the closing wall 82 is inclined on a downgrade toward the lower end 83b of the exhaust port 83. The closing wall 82 is provided at a position vertically higher than the door lock mechanism 26 (see FIG. 2).

The closing wall 82 is formed in the upper portion 45b of the hollow portion 45 to vertically divide the upper portion 45b of the hollow portion 45.

The exhaust port 83 is open at the same height position as that of the closing wall 82 in the second mounting portion 52 of the hollow portion 45 in the door thickness direction (arrow B direction). The exhaust port 83 is formed in a substantially rectangular shape configured by the upper end 83a, the lower end 83b, a front side 83c, and a rear side 83d (see FIGS. 12 and 13).

The exhaust port 83 is formed to communicate with the upper-end opening 46 through the inner space 65 of the enlarged portion 47.

Accordingly, the water flowing between the upper edge 12c of the front door opening 12 and the rear intersecting portion 35 of the front side door 13 can be guided to the exhaust port 83 through the upper-end opening 46, and the guided water can be exhausted from the exhaust port 83 and flow downward along the second mounting portion 52 of the vertical seal member 81.

The closing wall 82 is disposed at a position higher than the door lock mechanism 26 (see FIG. 2), and the exhaust port 83 positioned at the same height position as that of the closing wall 82 is open in the door thickness direction (arrow B direction). Further, the door lock mechanism 26 is positioned on the front end portion 31 side of the door body 24 (that is, door width direction (arrow A)) from the vertical seal member 81.

Accordingly, the exhaust port 83 is disposed at a position where the exhaust port is not overlapped with the door lock mechanism 26 in a circumferential direction (that is, displaced position). Thus, the water exhausted from the exhaust port 83 can flow downward while being separated from the door lock mechanism 26.

The closing wall 82 is inclined on a downgrade toward the exhaust port 83. Accordingly, the water flowing into the upper-end opening 46 can be smoothly guided to the exhaust port 83 through the closing wall 82. Thus, the water flowing between the upper edge 12c of the front door opening 12 and the rear intersecting portion 35 of the front side door 13 can be further suitably captured.

Returning to FIG. 13, a clip rib 86 is provided in a ring shape on the second enlarged wall 67 of the enlarged portion 47 to protrude outward along the second clip 72. The lip-shaped portion 84 extends downward from an end 86a of the clip rib 86.

That is, the lip-shaped portion 84 extends to the second enlarged wall 67 and the second mounting portion 52.

Particularly, the lip-shaped portion 84 vertically extends along a mounting intersecting portion 55 of the first mounting portion 51 and the second mounting portion 52 in the second mounting portion 52. The lip-shaped portion 84 is positioned in the vicinity of the front side 83c of the exhaust port 83, and is disposed between the hole portion 56 and the front side 83c.

The lip-shaped portion 84 protrudes from the outer surface of the first mounting portion 51 toward the outside in the vehicle width direction.

It is considered that the exhaust port 83 is provided in the second mounting portion 52 of the vertical seal member 81 so that it becomes difficult to ensure the rigidity of the vertical seal member 81. In this regard, the lip-shaped portion 84 is positioned in the vicinity of the exhaust port 83.

Accordingly, the rigidity of the vertical seal member 81 can be improved by the lip-shaped portion 84, thereby ensuring the rigidity of the vertical seal member 81.

The hole portion 56 is formed in the first mounting portion 51 (that is, the position where the hollow portion 45 faces the door lock mechanism 26 (see FIG. 2)). Further, the lip-shaped portion 84 is formed to vertically extend between the hole portion 56 and the exhaust port 83.

Accordingly, the lip-shaped portion 84 can prevent that the water exhausted from the exhaust port 83 flows to the hole portion 56 or the door lock mechanism 26.

The description will be given on the basis of FIGS. 15A and 15B about an example in which the water flowing between the upper edge 12c of the front door opening 12 and the rear intersecting portion 35 of the front side door 13 is captured by the vertical seal member 81.

Figure 15A:
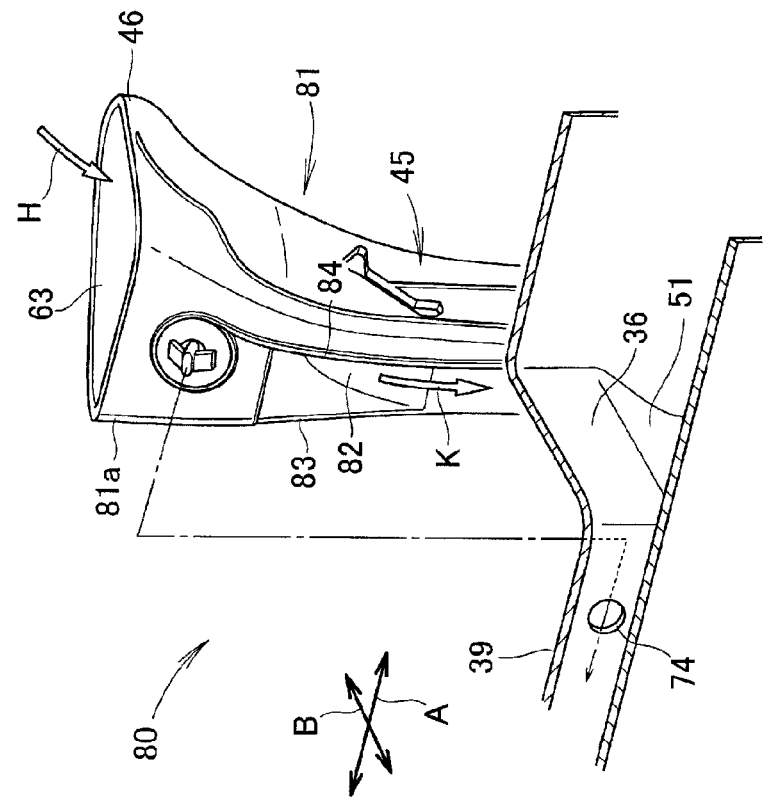
FIGS. 15A and 15B are diagrams illustrating an example in which water is captured by a vertical seal member according to the second embodiment.
Figure 15B:
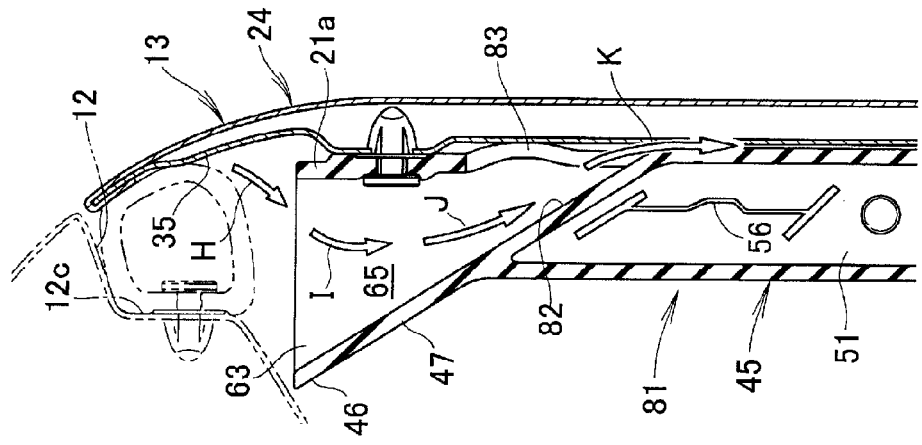

As illustrated in FIGS. 15A and 15B, water flows from between the upper edge 12c of the front door opening 12 and the rear intersecting portion 35 of the front side door 13 to the vehicle interior side, that is, the upper side of the upper-end opening 46 of the vertical seal member 81 as indicated by arrow H.

The water receiving port 63 of the upper-end opening 46 is largely open. Accordingly, the water flowing to the upper side of the upper-end opening 46 can be efficiently received by the water receiving port 63. The water received by the water receiving port 63 is guided to the inner space 65 of the enlarged portion 47 through the water receiving port 63 as indicated by arrow I.

The water guided to the enlarged portion 47 is guided toward the closing wall 82 as indicated by arrow J.

The water guided to the closing wall 82 can be exhausted from the exhaust port 83 through the closing wall 82 as indicated by arrow K to flow downward along the vertical seal member 81. Accordingly, the water flowing between the upper edge 12c of the front door opening 12 and the rear intersecting portion 35 of the front side door 13 can be reliably captured.

The water flowing between the upper edge 12c of the front door opening 12 and the rear intersecting portion 35 of the front side door 13 is guided to the water receiving port 63 of the upper-end opening 46.

Accordingly, it can be prevented that the force of the flowing water is applied to the vertical seal member 81 (particularly, an upper end 81a (a position corresponding to the upper end 21a according to the first embodiment)). Thus, a stable state can be maintained while the vertical seal member 81 is not affected by the force of the flowing water.

The exhaust port 83 is disposed at a position higher than the door lock mechanism 26 (see FIG. 2), and the exhaust port 83 is disposed at a position where the exhaust port is not overlapped with the door lock mechanism 26 in the circumferential direction (that is, displaced position).

Accordingly, the water exhausted from the exhaust port 83 can flow downward while being separated from the door lock mechanism 26, and it can be prevented that the water is applied to the door lock mechanism 26.

The lip-shaped portion 84 extending vertically is formed between the hole portion 56 and the exhaust port 83. Accordingly, the lip-shaped portion 84 can prevent that the water exhausted from the exhaust port 83 flows to the hole portion 56 or the door lock mechanism 26 (see FIG. 2), and thus it is further suitably prevented that the water is applied to the door lock mechanism 26.

The lip-shaped portion 84 can prevent that the water exhausted from the exhaust port 83 flows from the hole portion 56 into the hollow portion 45. Accordingly, the water exhausted from the exhaust port 83 can be smoothly guided downward along the vertical seal member 81.

Thus, the water flowing between the upper edge 12c of the front door opening 12 and the rear intersecting portion 35 of the front side door 13 can be further reliably captured.

The vehicle structure with a door seal according to the present invention is not limited to the above-described embodiment, and may be modified or improved as appropriate.

For example, in the second embodiment, the description has been given about the configuration in which the closing portion 48 is not provided in the upper-end opening 46 of the vertical seal member 81. However, the upper-end opening is not limited thereto, and the closing portion 48 may be provided in the upper-end opening 46 similarly with the vertical seal member 21 in the first embodiment.

The closing portion 48 is provided in the upper-end opening 46 so that the second clip 72 can be covered from the upper side by the closing portion 48 similarly with the first embodiment, and thus the second clip 72 can be hidden not to be visually observed.

In the first embodiment and the second embodiment, the description has been given about the example in which the vertical seal members 21 and 81 are attached to the rear end portion 32 of the front side door 13. However, the vertical seal members 21 and 81 are not limited thereto, and may be attached to the front end portion 31 of the front side door 13.

The vertical seal members 21 and 81 may be attached to the front end portion or the rear end portion of the rear side door 16. Additionally, the vertical seal members 21 and 81 may be attached to the left side portion or the right side portion of the rear door.

The shapes and configurations of the vehicle body, the vehicle structure with a door seal, the front door opening, the front side door, the upper-edge seal member, the vertical seal member, the door body, the door lock mechanism, the hollow portion, the upper-end opening, the enlarged portion, the closing portion, the first mounting portion, the hole portion, the second clip, the closing wall, the exhaust port, the lip-shaped portion, and the like, which have been described in the first embodiment and the second embodiment, are not limited to the examples described herein, and modifications can be made as appropriate.

INDUSTRIAL APPLICABILITY

The present invention is particularly suitable for application to a vehicle having a vehicle structure with a door seal in which a door is openably and closably supported by a door opening of a vehicle body, and a vertical seal member is attached to the door.

DESCRIPTION OF REFERENCE NUMERALS AND SIGNS 10, 80 . . . vehicle structure with a door seal,
12 . . . front door opening (door opening),
12c . . . upper edge of front door opening,
13 . . . front side door (door),
18 . . . upper-edge seal member,
21, 81 . . . vertical seal member,
24 . . . door body,
26 . . . door lock mechanism,
31 . . . front end portion of door body (one end of door),
32 . . . rear end portion of door body (the other end of door, end portion in door width direction),
45 . . . hollow portion,
45a . . . upper end of hollow portion,
46 . . . upper-end opening,
47 . . . enlarged portion,
47b . . . upper end of enlarged portion,
48 . . . closing portion,
51 . . . first mounting portion (portion of hollow portion in door thickness direction),
56 . . . hole portion,
72 . . . second clip (clip),
82 . . . closing wall,
83 . . . exhaust port,
84 . . . lip-shaped portion,
Ve . . . vehicle body.

The invention claimed is:

1. A vehicle structure with a door seal in which a door is openably and closably supported by a door opening of the vehicle body, the vehicle structure with a door seal comprising:
an upper-edge seal member which is attached to the vehicle body along an upper edge of the door opening; and
a vertical seal member which is vertically separated from the upper-edge seal member, extends vertically, and is attached to an end portion of the door in a door width direction, wherein:
the vertical seal member includes:
a hollow portion which is formed downward in a hollow shape;
an upper-end opening which is open upward on an upper side of the hollow portion; and
an enlarged portion which is interposed between the upper-end opening and the hollow portion and of which an upper end is open and enlarged;
the door is supported by the vehicle body to be turnable about one end of the door;
the door includes a door lock mechanism for fixing the door to the vehicle body, and the door lock mechanism is positioned on the one end side from the vertical seal member; and
the vertical seal member includes:
a closing wall which is provided at a position vertically higher than the door lock mechanism and vertically divides the hollow portion; and
an exhaust port which is provided at the same height position as a position of the closing wall in a door thickness direction of the door, and communicates with the upper-end opening.

2. The vehicle structure with the door seal according to claim 1, wherein
the vertical seal member is attached to the other end of the door.

3. The vehicle structure with the door seal according to claim 1, wherein
the closing wall is inclined toward the exhaust port.

4. The vehicle structure with the door seal according to claim 1, wherein
the vertical seal member includes:
a hole portion which is formed at a portion of the hollow portion in the door thickness direction when the hollow portion is formed; and
a lip-shaped portion which vertically extends between the hole portion and the exhaust port and protrudes outward.

5. The vehicle structure with the door seal according to claim 4, wherein
the lip-shaped portion is positioned in the vicinity of the exhaust port.

* * * * *